United States Patent Office 3,595,926
Patented July 27, 1971

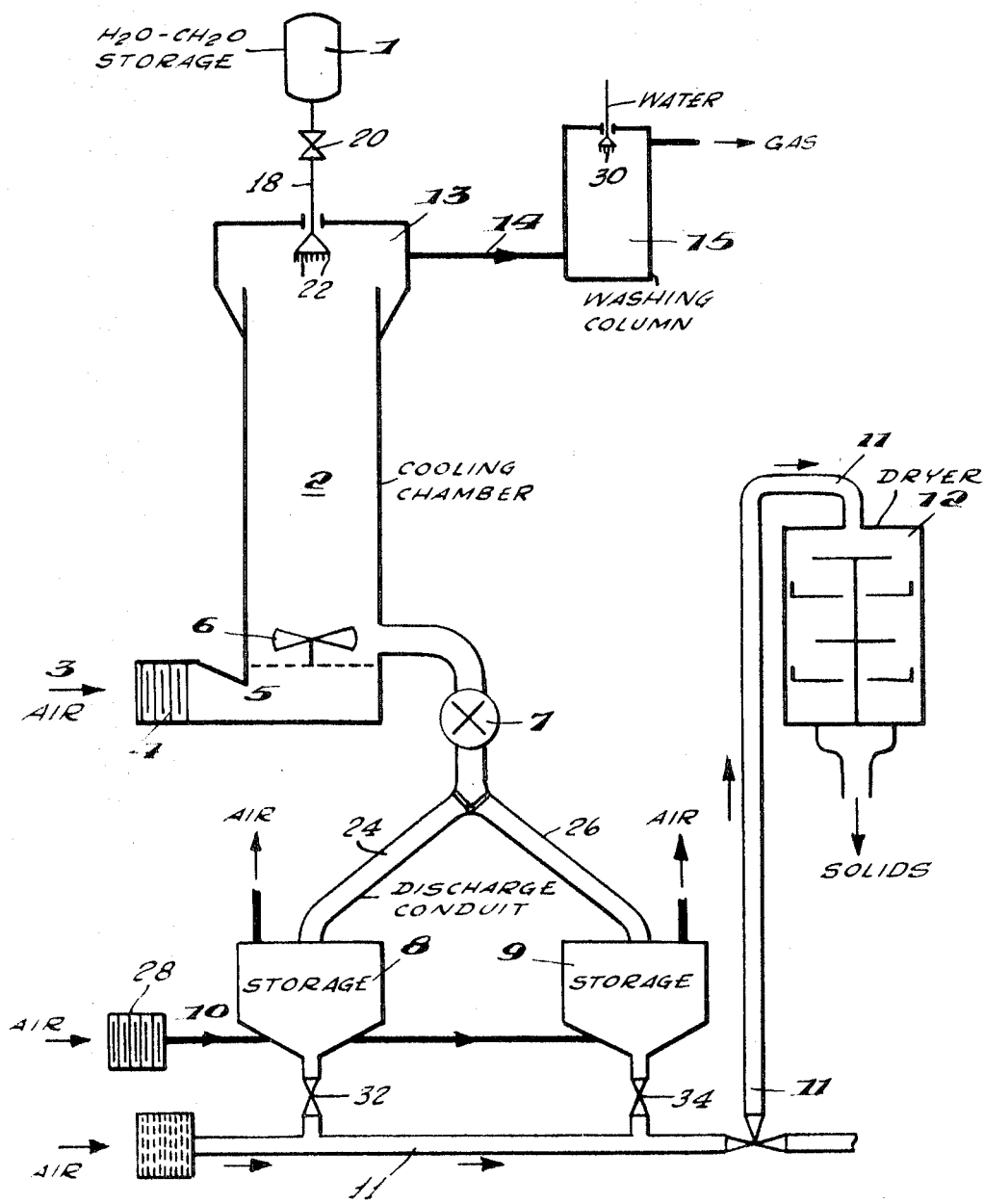

3,595,926
PRODUCTION OF FREE FLOWING
PARAFORMALDEHYDE
Hans-Joachim Mann, Mainz (Rhine), Walter Pohl, Gotzenhain uber-Langen, Klaus Simon, Buschschlag uber-Sprendlingen, and Wolfgang Weigert, Offenbach am Main, Germany, assignors to Deutsche Gold-und Silber Scheideanstalt vormals Roessler, Frankfurt am Main, Germany
Continuation of application Ser. No. 673,198, Oct. 5, 1967, which is a continuation-in-part of application Ser. No. 632,905, Apr. 24, 1967. This application Oct. 24, 1969, Ser. No. 869,393
Claims priority, application Germany, May 9, 1967, D 53,028
Int. Cl. C07c 47/10
U.S. Cl. 260—615.5
7 Claims

ABSTRACT OF THE DISCLOSURE

Process for the production of a free flowing paraformaldehyde product which comprises spraying a liquid formaldehyde concentrate containing 85 to 90% by weight of formaldehyde in the form of droplets into the upper portion of a cooling tower supplying a cooling inert gas at a temperature which is below $+39°$ C., and preferably between $-40$ and $+30°$ C., to the cooling tower and passing it upwardly therethrough, permitting the droplets to solidify as they drop through the rising gas before they reach the bottom of the tower and withdrawing the solidified particles from the bottom of the tower. Preferably a fluidized bed of solidified paraformaldehyde particles is maintained in the bottom portion of the tower and the solidified particles are further cooled after removal from the tower.

RELATED APPLICATION

This is a continuation of application Ser. No. 673,198, filed Oct. 5, 1967 and now abandoned which in turn is a continuation-in-part of application Ser. No. 632,905, filed Apr. 24, 1967 and now abandoned.

BACKGROUND OF THE INVENTION

The invention relates to an improved process for the production of free flowing paraformaldehyde.
It is known that a free flowing formaldehyde product can be produced by spraying an aqueous formaldehyde concentrate containing 80 to 90 wt. percent of formaldehyde into a spray drier constructed so as to maintain a fluidized bed of the sprayed particulate product in the lower portion thereof while passing a current of air having a temperature between 40 and 60° C. upwardly through the spray drier, as described in U.S. Pat. No. 3,316,309. It has, however, been found that, while such process is operative for small scale operations such as laboratory operations, it could not be carried out satisfactorily when employed in large scale technical operations. In large scale operations it was found that the small paraformaldehyde spheres which are the primary product are not sufficiently free of tackiness so that they quickly agglomerate and after a short period of operation the process comes to a standstill because of complete clogging of the nozzles employed, the spray chamber and the drying air passages and particularly the sieve plates through which the air is supplied to the fluidized bed maintained in the lower portion of the spray drier.

SUMMARY OF THE INVENTION

According to the invention it was unexpectedly found that a non-tacky free flowing product could be obtained even in large scale technical operations if the aqueous formaldehyde concentrate which has a formaldehyde content of 85 to 90 wt. percent is sprayed into a chamber and cooled down with the aid of a countercurrently flowing inert gas or gas mixture having a temperature below $+39°$ C. and, if necessary, removing any remaining heat by other known methods. The paraformaldehyde is produced in the form of small white spheres having a formaldehyde content of about 89 to 91 wt. percent and a water content of about 9 to 10 wt. percent which have a completely dry surface which remains non-tacky even when subjected to pressure. The process according to the invention permits a disturbance free continuous production of a commercially useful paraformaldehyde product.

BRIEF DESCRIPTION OF THE DRAWING

The accompanying drawing diagrammatically shows an apparatus suitable for carrying out the process according to the invention.

DETAILED DESCRIPTION OF THE INVENTION INCLUDING PREFERRED EMBODIMENTS

As the tackiness of the surface of paraformaldehyde to a certain extent depends upon the water content of the surface layer, it was highly unexpected that the difficulties encountered with the prior art process in large scale operations described above could not be avoided by increasing the temperature employed for the drying air, and, thereby effecting a reduction in the water content, but rather by just the opposite, namely, decreasing the temperature of the air.

The formaldehyde concentrate employed according to the invention is expediently stored at a temperature between 90 and 120° C. at a nozzle pressure of about 2 to 8 kg./cm.$^2$. The cooling gas or gas mixture which is passed countercurrently upwardly through the sprayed formaldehyde concentrate is introduced into the lower end of the cooling chamber and is passed upwardly either at a constant velocity or a velocity which decreases as it rises, which, for example, can lie between about 0.3 to 3 m./sec.

The temperature of the cooling gas must be below $+39°$ C. and preferably should be between $-40°$ C. and $+30°$ C. Temperature between $-20$ and $+20°$ C. have been found especially advantageous. Inert gases or gas mixtures, such as, air, nitrogen, carbon dioxide, natural gas and the like can, for example, be used as the cooling gas.

It is critical for the process according to the invention that the paraformaldehyde spheres produced have been cooled to a temperateure below 40° C., preferably, to 20 to 30° C. when they leave the cooling chamber through the outlet in the lower end thereof. This cooling is primarily determined by the temperature range of the cooling gas employed according to the invention but also depends upon the time the paraformaldehyde remains in the cooling chamber, for instance, by maintenance of a fluidized bed in the lower end of such chamber, the velocity of the cooling gas which is essentially determined by the diameter of the cooling chamber. These variables must be adjusted with respect to each other depending upon the quantity of formaldehyde concentrate supplied. For example, if a larger quantity of formaldehyde concentrate is supplied it only is necessary to supply a correspondingly larger quantity of cooling gas. As indicated, a fluidized bed of paraformaldehyde particles can be maintained in the lower portion of the cooling chamber. In such case, for instance, the velocity of the stirrers which are located at the bottom of the cooling chamber and serve to discharge the paraformaldehyde spheres is maintained sufficiently slow so that the paraformaldehyde spheres remain suspended for several minutes, for instance, 2 to 15 minutes in the fluidized bed. The provision of a fluidized bed, however, is not essential for the success of the process according to the invention. In such instance it is only necessary to alter one or more of the other parameters mentioned above. For instance, when a fluidized bed is not provided, a cooling gas of a lower temperature can be employed, without alteration of the other conditions, to obtain essentially the same free flowing paraformaldehyde product.

It is possible in this way to remove 70 to 100% of the heat set free in the cooling chamber. When the removal of heat in the cooling chamber is not 100%, the remaining heat can be removed by other known methods. This, for example, can be achieved by storage for a number of hours while passing cold air therethrough, if necessary.

The thus obtained paraformaldehyde product with a paraformaldehyde content of 89 to 91 wt. percent can be after-dried to a 92–97 wt. percent absolutely dust free and free flowing product. Such after-drying, for instance, can be effected continuously on a contact drier at atmospheric pressure in 1 to 2 hours' treatment in such drier.

With reference to the drawing, the aqueous formaldehyde preconcentrate supply with a formaldehyde content of 85 to 90 wt. percent is stored in vessel 1. In order to prevent flocking out of paraformaldehyde, the preconcentrate must be maintained at a temperateure of at least 90° C. Temperatures higher than 120° C. should also be avoided as they lead to formic acid formation by thermal disproportionation of the formaldehyde which reduces the quality of the product obtained. The preconcentrate is a water clear liquid with a density (80°) of 1.225 (85% formaldehyde) to 1.240 (90% formaldehyde) and a viscosity of about 2.5 cp. It is supplied to the cooling chamber 2 via conduit 18 through a valve 20 sieve at a gauge pressure of about 3 atmospheres. Heatable multistage centrifugal pumps whose parts coming into contact with the formaldehyde are of stainless steel are suited for supplying the formaldehyde to nozzles 22 in the cooling chamber. Such supply can also be effected by impressing nitrogen at a temperature of 90 to 120° C. The preconcentrate is sprayed into the cooling chamber through the nozzles which are arranged in a nozzle head which can be heated from all sides. In order to avoid disturbances a sieve having a lower mesh width than the diameter of the nozzles is provided ahead of the nozzles. One or two material nozzles of various constructions can be used as the nozzles. Preferably conical single material nozzles with a narrow spraying angle, preferably between 15 and 45° and with a bore of 1 to 5 mm. are employed. The cooling gas is supplied through conduit 3 and is cooled to the proper temperature in heat exchanger 4. The liquid droplets which fall down through the cooling gas stream which flows countercurrently thereto at a velocity of 0.5 to 3 m./sec. in the cooling chamber solidify to small white spheres. A fluidized bed of the solidified spheres can be formed above sieve plate 5 in the lower portion of the cooling chamber in which the product is cooled to 20 to below 40° C. depending upon the time it stays in the fluidized bed. The quenching of the surface of the product to such low temperature is necessary in order to obtain a tack free surface. The product which is withdrawn from the cooling chamber with the aid of stirrer 6 can alternately be supplied over discharge element 7 through conduits 24 and 26 to one or the other of storage bunkers 8 and 9 where it is stored for 1–2 hours, expediently while blowing cold air (0 to 20° C.) therethrough from blower 28 and conduit 10. In order to effect a further continuous drying, the product can be supplied through valves 32 and 34 to conduit 11 and then over conduit 11 to a contact drier 12. After passing over the heated contact surfaces (90 to 100° C.) during a period of 90 minutes, a spherical almost water free paraformaldehyde with a formaldehyde content of 95 to 97% can be obtained.

The cooling gas leaves the head 13 of the cooling chamber 2 through conduit 14. The formaldehyde contained in the cooling gas can, for example, be recovered by washing with water introduced through sprayer 30 in washing column 15.

The paraformaldehyde obtained according to the invention is spherical, dust-free, stable on aging, of excellent free flowing properties and non-agglomerable even under pressure so that it can, for example, be stored in quantities of up to 20 tons in bunkers for days without pneumatic loosening and without reduction in its free flowing properties. It also, for example, can be stored for several weeks in sacks stacked up to 24 high. Both the 89 to 91% and the 92 to 97% products have a very good reactivity and ease of depolymerization. The product therefore is especially adapted as a technical starting material for the production of condensation products.

The following examples will serve to illustrate the process according to the invention.

EXAMPLE 1

901.0 kg. of a formaldehyde preconcentrate (89.7%) were passed continuously at a temperature of 100° C. and under a nitrogen pressure of 3 atmospheres gauge through a sieve having a mesh width of 1 mm. during the course of 2 hours and through 7 single material conical nozzles of a diameter of 1.2 mm. into a cooling tower 12 meters high and about 1 meter in diameter as shown in the drawing while 5500 m.$^2$/hour of air were introduced into the bottom of the tower and passed upwardly therethrough at a velocity of 1 m./sec. The temperature of the air at the inlet was +2° C. The product was retained in the fluidized bed formed above the air inlet for 10 minutes and was then discharged to an intermediate bunker where it was stored for 12 hours. 877.1 kg. of a completely tack free and free flowing spherical product with a formaldehyde content of 90.2 wt. percent was obtained. 17.3 kg. of formaldehyde were recovered from the exhausted air by a water wash. No paraformaldehyde deposited on the walls of the cooling tower, the head of the cooling tower, the sieve plate thorugh which the cooling air was supplied or the dscharge for the product. The particle size distribution in the product was >1.5 mm. 0 wt. percent; >1.0 mm. 2.0 wt. percent; >0.75 mm. 6.5 wt. percent; >0.60 mm. 7.5 wt. percent; >0.3 mm. 54.5 wt. percent; >0.2 mm. 19 wt. percent; >0.1 mm. 10.5 wt. percent; <0.1 mm. 0 wt. percent. The formaldehyde content of the product could be increased to 94.9% by drying on a contact plate drier in 1 hour in layers 10 mm. deep with a contact surface temperature of 95° C.

EXAMPLE 2

1825 kg./hour of formaldehyde preconcentrate with a formaldehyde content of 86% were sprayed into a cooling tower 17 meters high and 2.50 meters in diameter as described in Example 1 through 10 conical spiral nozzles of 1.8 mm. diameter at a gauge pressure of 3 atmospheres. 14000 m.$^3$/hour of air were passed countercurrently upwardly through the cooling tower. The inlet temperature of such air was 15° C. After remaining in the fluidized bed maintained in the bottom of the cooling tower for about 5 minutes and 12 hours intermediate storage 1715 kg./hour of a tack free granulate (formaldehyde content 90%) suitable for sacking were obtained. The particle size distribution in the product was >1.5 mm. 0 wt. percent; >1.0 mm. 13.0 wt. percent; >0.75 mm. 18.5 wt. percent; >0.6 mm. 18.0%; >0.3 mm. 38.5%; >0.2 mm. 7 wt. percent; >0.1 mm. 5 wt. percent; <1 mm. 0 wt. percent. 26 kg./hour of formaldehyde were recovered by scrubbing the exhausted air with water. The process could be continued for days without the necessity of cleaning the product and air passages mechanically.

We claim:
1. A process for the production of a free flowing paraformaldehyde product which consists essentially of spraying a liquid aqueous formaldehyde concentrate containing 85 to 90 weight percent of formaldehyde at a temperature between 90 and 120° C. into the upper portion of an elongated upright cooling chamber, passing an inert cooling gas countercurrently upwardly through the sprayed formaldehyde droplets as they drop down to solidify such droplets to paraformaldehyde spheres having a water content of about 9 to 10 weight percent and cool them to a temperature below +30° C. before they leave the cooling chamber through an exit in the lower portion thereof, and subsequently passing cold air through the solidified product for several hours to remove any remaining heat therein.

2. The process of claim 1 in which the temperature of the cooling gas is betwen —40 and +30° C.

3. The process of claim 1 comprising in addition subsequentiy heating the product to dry it to a formaldehyde content of 92 to 97%.

4. The process of claim 1 in which the solidified product is maintained for about 2 to 15 minutes in a fluidized bed maintained in the lower end of the cooling chamber before it leaves the cooling chamber.

5. The process of claim 1 in which the solidified droplets are cooled to a temperature of 20° C. to 30° C. before they leave the cooling chamber.

6. A process according to claim 1 comprising passing air at 0° to 20° C. through the resulting solidified product for several hours to remove any remaining heat therein.

7. A process according to claim 1 wherein the inert gas is selected form the group consisting of air, nitrogen, carbon dioxide and natural gas.

References Cited

UNITED STATES PATENTS

| | | |
|---|---|---|
| 2,568,017 | 9/1951 | MacLean et al. |
| 2,568,018 | 9/1951 | MacLean et al. |
| 2,992,277 | 7/1961 | Porter. |
| 3,316,309 | 4/1967 | Mann et al. |
| 3,351,668 | 11/1967 | Junkermann et al. |

FOREIGN PATENTS

| | | |
|---|---|---|
| 866,079 | 4/1961 | Great Britain. |
| 1,019,486 | 2/1960 | Great Britain. |

HOWARD T. MARS, Primary Examiner